United States Patent
Shimizu et al.

(10) Patent No.: US 10,418,190 B2
(45) Date of Patent: Sep. 17, 2019

(54) ELECTRONIC COMPONENT MANUFACTURING METHOD AND FILM FORMING APPARATUS

(71) Applicant: MURATA MANUFACTURING CO., LTD., Kyoto-fu (JP)

(72) Inventors: Kotaro Shimizu, Kyoto-fu (JP); Toshiki Miyazaki, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 644 days.

(21) Appl. No.: 14/825,013

(22) Filed: Aug. 12, 2015

(65) Prior Publication Data

US 2016/0059263 A1    Mar. 3, 2016

(30) Foreign Application Priority Data

Aug. 27, 2014  (JP) .................................. 2014-173014

(51) Int. Cl.
*H01G 13/00* (2013.01)
*H01G 4/12* (2006.01)
*H01G 4/30* (2006.01)

(52) U.S. Cl.
CPC ........... *H01G 13/00* (2013.01); *H01G 13/006* (2013.01); *H01G 4/12* (2013.01); *H01G 4/30* (2013.01)

(58) Field of Classification Search
CPC . B05D 5/08; B05D 1/02; H01G 13/00; H01G 13/006; H01G 4/30; H01G 4/12
See application file for complete search history.

(56) References Cited

U.S. PATENT DOCUMENTS

2012/0120547 A1    5/2012  Ro et al.
2012/0296032 A1   11/2012  Legein et al.

FOREIGN PATENT DOCUMENTS

| JP | S60-178612 A | 9/1985 |
| JP | S62-156807 A | 7/1987 |
| JP | 2000-277373 A | 10/2000 |

(Continued)

OTHER PUBLICATIONS

Machine Translation of JP2004119785.*
(Continued)

*Primary Examiner* — Christopher T Schatz
(74) *Attorney, Agent, or Firm* — Studebaker & Brackett PC

(57) ABSTRACT

An electronic component manufacturing method includes inserting an electronic component base body, which has a substantially rectangular parallelepiped shape and paired opposing end surfaces, paired opposing lateral surfaces connecting the end surfaces, and paired opposing principal surfaces perpendicular to the end surfaces and the lateral surfaces and connecting the end surfaces, in a receiving portion of a component holder. The receiving portion defining an accommodation space that is capable of receiving the electronic component base body, forming an oleophobic film over the surfaces of the electronic component base body by exposing the surfaces of the electronic component base body inserted in the receiving portion to gas containing an oleophobic material, taking out the electronic component base body, which includes the oleophobic film formed thereon, from the receiving portion, and forming outer electrodes on the electronic component base body having been taken out.

7 Claims, 21 Drawing Sheets

(56) References Cited

FOREIGN PATENT DOCUMENTS

| | | | |
|---|---|---|---|
| JP | 2003-017374 | A | 1/2003 |
| JP | 2004-119785 | A | 4/2004 |
| JP | 2009-085589 | A | 4/2009 |
| JP | 2012-069827 | A | 4/2012 |
| JP | 2012-244104 | A | 12/2012 |
| JP | 2014-103195 | A | 6/2014 |
| KR | 2012-0052818 | A | 5/2012 |
| KR | 2014-0043737 | A | 4/2014 |

OTHER PUBLICATIONS

Machine Translation of JP200317374.*
An Office Action; "Notice of Reasons for Rejection," issued by the Japanese Patent Office dated May 16, 2017, which corresponds to Japanese Patent Application No. 2014-173014 and is related to U.S. Appl. No. 14/825,013; with English language translation.
An Office Action; "Notification of Preliminary Rejection," issued by the Korean Patent Office dated Jun. 9, 2016, which corresponds to Korean Patent Application No. 10-2015-0119532 and is related to U.S. Appl. No. 14/825,013; with English language translation.

\* cited by examiner

ELECTRONIC COMPONENT MANUFACTURING METHOD AND FILM FORMING APPARATUS

CROSS-REFERENCE TO RELATED APPLICATION

This application claims benefit of priority to Japanese Patent Application No. 2014-173014 filed Aug. 27, 2014, the entire content of which is incorporated herein by reference.

TECHNICAL FIELD

The present disclosure relates to an electronic component manufacturing method and a film forming apparatus for use in the electronic component manufacturing method.

BACKGROUND

In general, a method of manufacturing an electronic component, which is represented by, e.g., a multilayer ceramic capacitor, includes a step of carrying out surface treatment on a treatment object. The step of carrying out surface treatment is disclosed in Japanese Unexamined Patent Application Publication No. 2000-277373, for example.

In an electronic component manufacturing method disclosed in Japanese Unexamined Patent Application Publication No. 2000-277373, wettability in a surface of a treatment object (electronic component base body) can be improved by heating the treatment object in a state where the treatment object is held by a rubber member, or by immersing the treatment object in silicone oil and then drying the treatment object.

A step of removing an organic substance (binder) contained in the treatment object is also known, though it is different from a step of forming an oleophobic film, as one type of a step of causing atmosphere gas to act on the surface or the interior of the treatment object.

In the step of removing the organic substance, heat treatment is carried out while the atmosphere gas is supplied such that inner electrodes of the treatment object are not oxidized. For example, Japanese Unexamined Patent Application Publication No. 2009-85589 discloses a method of manufacturing an electronic component, the method including the step of removing the organic substance.

In the step of removing the organic substance, disclosed in Japanese Unexamined Patent Application Publication No. 2009-85589, the electronic component is heated in a state where atmosphere gas is regulated, by employing a baffle plate including an opening formed at a predetermined position, such that the atmosphere gas having passed through the opening passes just above the electronic component, which is mounted on a mounting surface of a ceramic container (sagger). Thus, the organic substance is removed with flow of the atmosphere gas passing just above the electronic component.

SUMMARY

A step of bringing gas into contact with the surface of the electronic component and forming a film having an oleophobic property (i.e., an oleophobic film) on the surface of the electronic component is supposed as another form of the step of carrying out surface treatment on the treatment object.

With the method of manufacturing the electronic component by employing the atmosphere gas, disclosed in Japanese Unexamined Patent Application Publication No. 2009-85589, however, because the electronic component is mounted on the mounting surface of the ceramic container, a sufficient spacing cannot be ensured, in a contact region of the surface of the electronic component with the mounting surface, between the contact region and the mounting surface. Moreover, the baffle plate is disposed to regulate the atmosphere gas such that the atmosphere gas passes just above the electronic component. As a result, with the electronic component manufacturing method disclosed in Japanese Unexamined Patent Application Publication No. 2009-85589, the atmosphere gas cannot be supplied in a way of flowing around the entirety of the electronic component.

If the process used in the step of the electronic component manufacturing method, disclosed in Japanese Unexamined Patent Application Publication No. 2009-85589, is applied to the step of forming the oleophobic film on an entire surface of the electronic component, the gas could not be supplied in a way of flowing around an entire surface of an electronic component base body. It would be hence difficult to form a uniform oleophobic film over the entire surface of the electronic component base body.

In view of the problems mentioned above, an object of the present disclosure is to provide an electronic component manufacturing method and a film forming apparatus, which are able to perform surface treatment on almost overall surfaces of an electronic component base body by employing gas.

According to a preferred embodiment of the present disclosure, there is provided an electronic component manufacturing method including the steps of inserting an electronic component base body in a receiving portion of a component holder, which has a substantially rectangular parallelepiped shape and which has a pair of end surfaces positioned in opposing relation, a pair of lateral surfaces positioned in opposing relation, and a pair of principal surfaces positioned in opposing relation, the receiving portion defining an accommodation space that has a recessed shape and is capable of receiving the electronic component base body; forming an oleophobic film over the surfaces of the electronic component base body by bringing gas containing an oleophobic material into contact with the surfaces of the electronic component base body inserted in the receiving portion; taking out the electronic component base body, which includes the oleophobic film formed thereon, from the receiving portion; and forming outer electrodes on the electronic component base body taken out from the receiving portion.

In the electronic component manufacturing method according to the preferred embodiment of the present disclosure, preferably, the electronic component base body has a shape with a length size L1 being larger than each of a width size W1 and a thickness size T1, given that a size of the electronic component base body in a lengthwise direction in which the pair of end surfaces are arranged in opposing relation is the length size L1, a size of the electronic component base body in a widthwise direction in which the pair of lateral surfaces are arranged in opposing relation is the width size W1, and a size of the electronic component base body in a thickness direction in which the pair of principal surfaces are arranged in opposing relation is the thickness size T1. In that case, preferably, in the step of inserting the electronic component base body, the electronic component base body is inserted in the receiving portion in a state where the electronic component base body is in an upstanding or inclined posture such that one of the pair of end surfaces is directed to a bottom side of the receiving portion.

In the electronic component manufacturing method according to the preferred embodiment of the present disclosure, preferably, the accommodation space includes a substantially rectangular parallelepiped space that has a width size W2 larger than the width size W1 of the electronic component base body and a thickness size T2 larger than the thickness size T1 of the electronic component base body when viewed from a direction perpendicular to an opening surface of the receiving portion. In that case, preferably, the component holder satisfies a condition that the width size W2 and the thickness size T2 are each smaller than the length size L1 of the electronic component base body.

In the electronic component manufacturing method according to the preferred embodiment of the present disclosure, preferably, the step of taking out the electronic component base body includes a step of causing the other one of the pair of end surfaces to be stuck to and held by an adhesive holding member, and taking out the electronic component base body from the receiving portion.

In the electronic component manufacturing method according to the preferred embodiment of the present disclosure, preferably, in the step of inserting the electronic component base body, the electronic component base body is inserted in the receiving portion in a state where at least a part of the electronic component base body at a side including the other end surface protrudes from the accommodation space, by employing the component holder in which a depth size L2 representing a size of the accommodation space in a depth direction is smaller than the length size L1 of the electronic component base body, and the depth size L2 is defined by a distance between a bottom of the receiving portion and an opening surface of the receiving portion. In that case, preferably, the step of forming the outer electrodes includes a step of applying a conductive paste, which is to be the outer electrodes, over an end portion of the electronic component base body at a side including the one end surface in the state where the other end surface is stuck to and held by the adhesive holding member.

In the electronic component manufacturing method according to the preferred embodiment of the present disclosure, preferably, the method further includes a step of preparing a component transfer unit including a receiving portion for transfer defining an accommodation space for transfer that has a recessed shape and is capable of receiving the electronic component base body. Furthermore, preferably, the step of taking out the electronic component base body includes a step of transferring the electronic component base body, which includes the oleophobic film formed thereon, into the receiving portion for transfer from the receiving portion. Moreover, preferably, the accommodation space for transfer includes a substantially rectangular parallelepiped space that has a width size W3 larger than the width size W1 of the electronic component base body and a thickness size T3 larger than the thickness size T1 of the electronic component base body when viewed from a direction perpendicular to the opening surface of the receiving portion for transfer. In that case, preferably, the component transfer unit used in the transferring step satisfies at least a condition that the width size W3 is smaller than the width size W2 of the accommodation space, or a condition that the thickness size T3 is smaller than the thickness size T2 of the accommodation space, and satisfies a condition that a depth size L3 is smaller than the length size L1 of the electronic component base body, which represents a size of the accommodation space for transfer in the depth direction, and which is defined as a distance between a bottom of the receiving portion for transfer and the opening surface of the receiving portion for transfer. Still furthermore, preferably, the step of transferring the electronic component base body into the receiving portion for transfer includes a step of arranging the component transfer unit to face the component holder in a state where the receiving portion and the receiving portion for transfer are positioned to face each other, and a step of turning around the component holder and the component transfer unit facing each other such that the electronic component base body is inserted into the receiving portion for transfer in a state where at least a part of the electronic component base body at a side including the one end surface protrudes from the accommodation space for transfer. In that case, preferably, the step of forming the outer electrodes includes a step of taking out the electronic component base body from the receiving portion for transfer by causing the one end surface of the electronic component base body to be stuck to and held by the adhesive holding member, and applying a conductive paste, which is to be the outer electrodes, over an end portion of the electronic component base body at a side including the other end surface in the state where the one end surface is stuck to and held by the adhesive holding member.

According to another preferred embodiment of the present disclosure, there is provided a film forming apparatus that forms an oleophobic film over surfaces of an electronic component base body having a substantially rectangular parallelepiped shape, the film forming apparatus including a chamber having an inner space that is filled with gas used to form the oleophobic film, wherein the oleophobic film is formed over the surfaces of the electronic component base body in a state where a component holder is placed in the inner space, the component holder holding the electronic component base body inserted in a receiving portion, which defines an accommodation space capable of receiving the electronic component base body.

In the film forming apparatus according to the preferred embodiment of the present disclosure, preferably, the electronic component base body has a pair of end surfaces positioned in opposing relation, a pair of lateral surfaces positioned in opposing relation, and a pair of principal surfaces positioned in opposing relation. Preferably, the electronic component base body has a shape with a length size L1 being larger than each of a width size W1 and a thickness size T1, given that a size of the electronic component base body in a lengthwise direction in which the pair of end surfaces are arranged in opposing relation is the length size L1, a size of the electronic component base body in a widthwise direction in which the pair of lateral surfaces are arranged in opposing relation is the width size W1, and a size of the electronic component base body in a thickness direction in which the pair of principal surfaces are arranged in opposing relation is the thickness size T1. In that case, preferably, the component holder is placed in the inner space, the component holder holding the electronic component base body, which is inserted in the receiving portion in an upstanding or inclined posture with one of the pair of end surfaces being directed to a bottom side of the receiving portion.

With the present disclosure, the electronic component manufacturing method and the film forming apparatus are obtained which are able to perform surface treatment evenly on almost the overall surfaces of the electronic component base body by employing gas.

Other features, elements, characteristics and advantages of the present disclosure will become more apparent from the following detailed description of preferred embodiments of the present disclosure with reference to the attached drawings.

DETAILED DESCRIPTION

Figure 1:
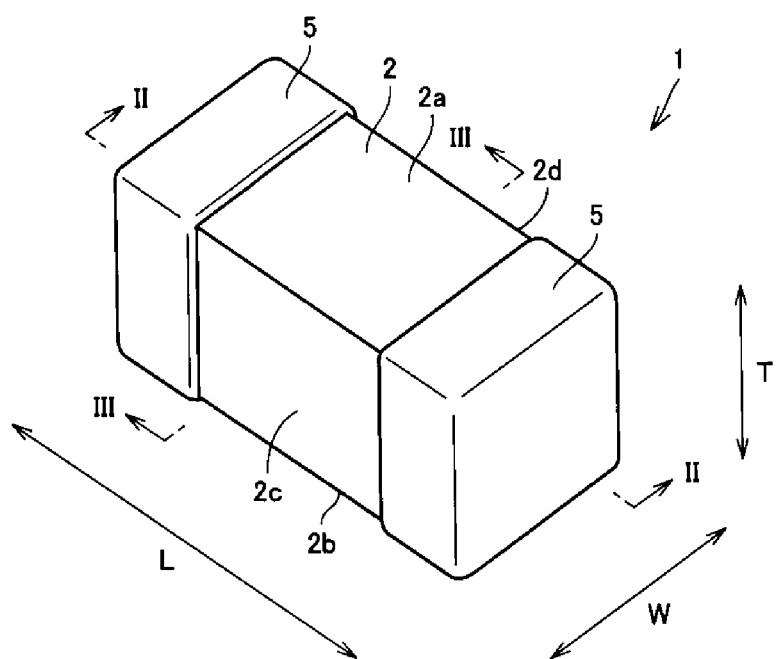
FIG. 1 is a perspective view of a multilayer ceramic capacitor manufactured in accordance with an electronic component manufacturing method according to a first embodiment of the present disclosure.

Embodiments of the present disclosure will be described in detail below with reference to the drawings. The following embodiments represent, by way of example, the case where the present disclosure is applied to a method of manufacturing a multilayer ceramic capacitor, as one of electronic components, and to a film forming apparatus that is used in the method of manufacturing the ceramic capacitor. In the following embodiments, the same or common constituent elements are denoted by the same reference signs in the drawings, and the description of those constituent elements is omitted.

First Embodiment

Prior to describing an electronic component manufacturing method according to a first embodiment of the present disclosure, a multilayer ceramic capacitor manufactured by the relevant manufacturing method is first described.

Figure 2:
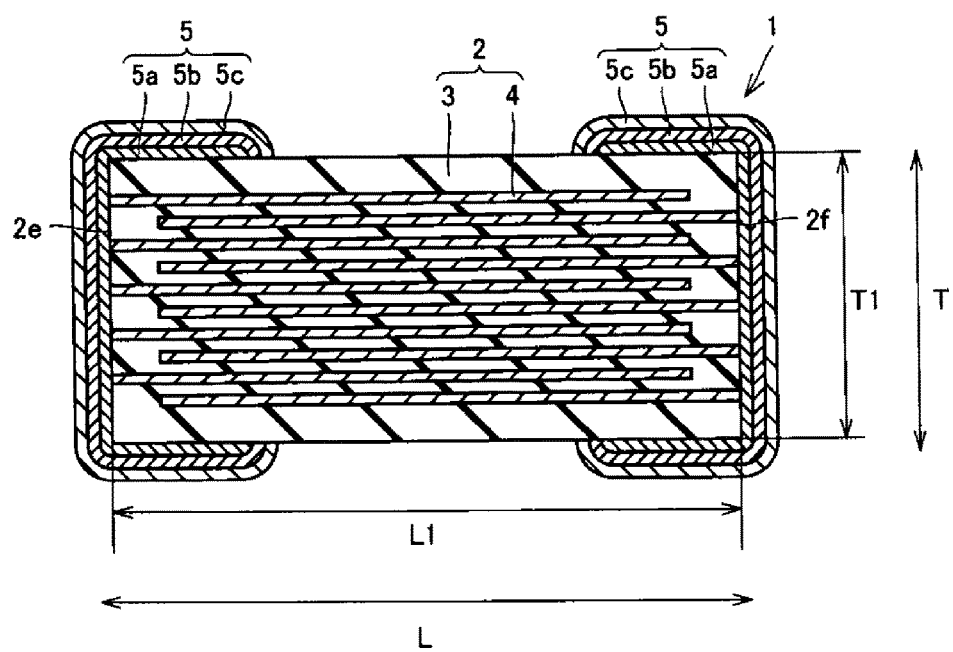
FIG. 2 is a sectional view, taken along a line II-II, of the multilayer ceramic capacitor illustrated in FIG. 1.
Figure 3:
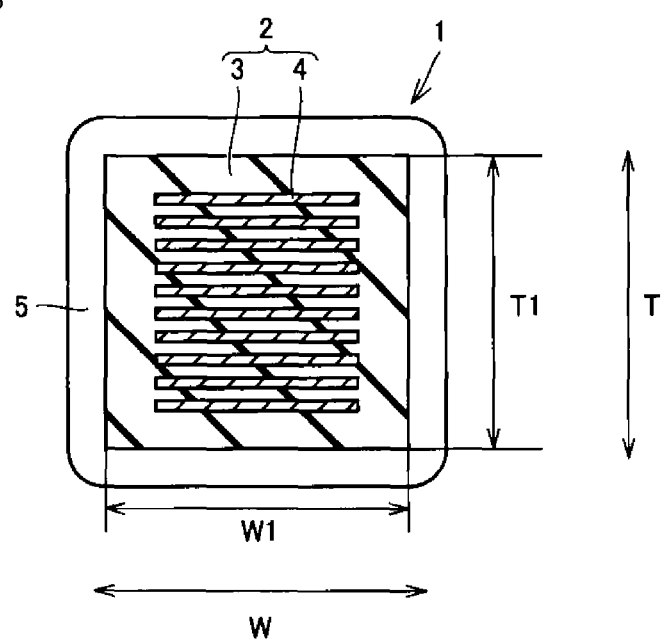
FIG. 3 is a sectional view, taken along a line III-III, of the multilayer ceramic capacitor illustrated in FIG. 1.

FIG. 1 is a perspective view of the multilayer ceramic capacitor manufactured in accordance with the electronic component manufacturing method according to the first embodiment of the present disclosure. FIG. 2 is a sectional view, taken along a line II-II, of the multilayer ceramic capacitor illustrated in FIG. 1. FIG. 3 is a sectional view, taken along a line III-III, of the multilayer ceramic capacitor illustrated in FIG. 1.

As illustrated in FIGS. 1 to 3, the multilayer ceramic capacitor 1 is an electronic component having a substantially rectangular parallelepiped shape in its entirety. The multilayer ceramic capacitor 1 includes an electronic component base body (ceramic base body) 2 and a pair of outer electrodes 5. The electronic component base body 2 has a pair of end surfaces 2e and 2f (see FIG. 2) that are positioned in opposing relation, a pair of lateral surfaces 2c and 2d that are positioned in opposing relation and that connect the pair of end surfaces 2e and 2f to each other, and a pair of principal surfaces 2a and 2b that are positioned perpendicularly to the pair of end surfaces 2e and 2f and the pair of lateral surfaces 2c and 2d and that connect the pair of end surfaces 2e and 2f to each other.

The above-mentioned term "rectangular parallelepiped shape" involves a substantially rectangular parallelepiped in which at least ones of corners and ridges are rounded. The above-mentioned term "rectangular parallelepiped shape" further involves a substantially rectangular parallelepiped in which negligible irregularities or step differences are formed in any of the pair of principal surfaces, the pair of end surfaces, and the pair of lateral surfaces.

As illustrated in FIGS. 2 and 3, the electronic component base body 2 is constituted by dielectric layers 3 and inner electrode layers 4, serving as conductor layers, which are alternately laminated in a predetermined direction. The dielectric layers 3 are each formed of a ceramic material containing barium titanate as a main component. The dielectric layer 3 may contain a Mn compound, a Mg compound, a Si compound, a Co compound, a Ni compound, a rare earth compound, etc. as accessory components of ceramic powder that is a raw material of a later-described ceramic sheet. On the other hand, the inner electrode layers 4 are each formed of a metal material represented by, e.g., Ni, Cu, Ag, Pd, an Ag—Pd alloy, or Au.

The electronic component base body 2 is fabricated through the steps of preparing a plurality of base sheets by printing conductive pastes, which become the inner electrode layers 4, on respective surfaces of ceramic sheets (so-called green sheets), which become the dielectric layers 3, forming a mother block by laminating the plurality of base sheets and pressure-bonding the laminated base sheets, and cutting the mother block into individual pieces.

The material of each dielectric layer 3 is not limited to the above-mentioned ceramic material containing barium titanate as a main component. Other ceramic materials having high dielectric constants (e.g., materials containing $CaTiO_3$, $SrTiO_3$, and $CaZrO_3$ as main components) may be optionally selected as the material of the dielectric layer 3. The material of each inner electrode layer 4 is also not limited to the above-mentioned metal material. Other conductive materials may be optionally selected as the material of the inner electrode layer 4.

As illustrated in FIGS. 1 and 2, the pair of outer electrodes 5 are disposed in a state spaced from each other and covering surfaces of both end portions of the electronic component base body 2 in a predetermined direction. The pair of outer electrodes 5 are each formed as a conductive film.

The pair of outer electrodes 5 are each constituted, for example, as a multilayer film made up of a sintered metal layer 5a and plated films 5b and 5c. The sintered metal layer 5a is formed, for example, by baking a paste made of, e.g., Cu, Ni, Ag, Pd, an Ag—Pd alloy, or Au, or a conductive paste containing metal powder made of any of those materials. The plated film 5b is, e.g., a Ni plated layer, and the plated film 5c is, e.g., a Sn plated layer. The plated layer may be provided as a single layer, and it may be a Cu plated layer or an Au plated layer.

As illustrated in FIG. 2, one of each pair of inner electrode layers 4 adjacent to each other in a laminating direction with the dielectric layer 3 sandwiched between them is electrically connected, inside the multilayer ceramic capacitor 1, to one of the pair of outer electrodes 5, and the other of each pair of inner electrode layers 4 adjacent to each other in the laminating direction with the dielectric layer 3 sandwiched between them is electrically connected, inside the multilayer ceramic capacitor 1, to the other of the pair of outer electrodes 5. Thus, a structure that plural capacitor elements are electrically connected in parallel is formed between the pair of outer electrodes 5.

Here, as illustrated in FIGS. 1 to 3, a direction in which the pair of end surfaces 2e and 2f are arranged in opposing relation is defined as a lengthwise direction L of the electronic component base body 2. A direction in which the pair of lateral surfaces 2c and 2d are arranged in opposing relation, the direction being perpendicular to the lengthwise direction L, is defined as a widthwise direction W. A direction in which the dielectric layers 3 and the inner electrode layers 4 are laminated in the electronic component base body 2, i.e., a direction in which the pair of principal surfaces 2a and 2b are arranged in opposing relation, the direction being perpendicular to both the lengthwise direction L and the widthwise direction W, is defined as a thickness direction T. When the directions are defined as described above, the illustrated electronic component base body 2 has an elongate and substantially rectangular parallelepiped shape in which a length size L1 along the lengthwise direction L is larger than each of a width size W1 along the widthwise direction and a thickness size T1 along the thickness direction.

Typical values of the length size L1, the width size W1, and the thickness size T1 of the electronic component base body 2 are, for example, about 1.0 mm×0.5 mm×0.5 mm, about 1.0 mm×0.5 mm×0.15 mm, about 1.0 mm×0.5 mm×0.1 mm, or about 1.0 mm×0.5 mm×0.08 mm.

Figure 4:
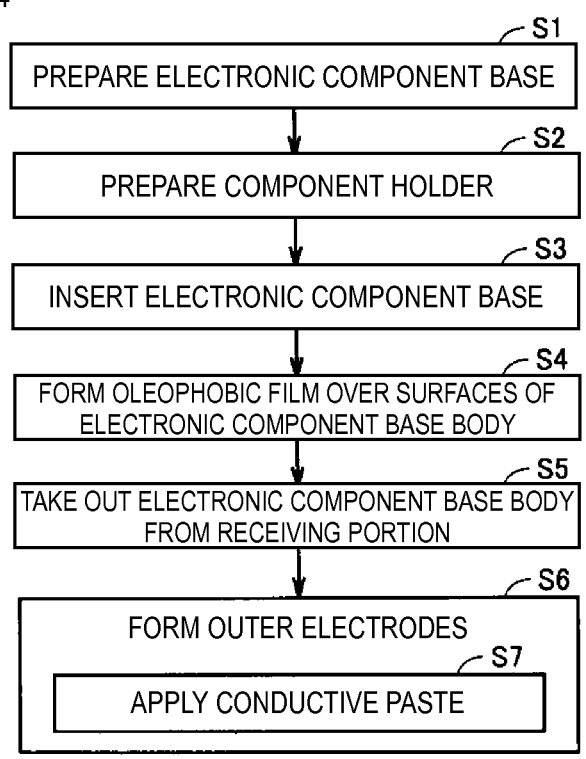
FIG. 4 is a flowchart illustrating an outline of a process of manufacturing the multilayer ceramic capacitor in accordance with the electronic component manufacturing method according to the first embodiment of the present disclosure.

FIG. 4 is a flowchart illustrating an outline of a process of manufacturing the multilayer ceramic capacitor in accordance with the electronic component manufacturing method according to this embodiment. FIGS. 5 to 16 are explanatory views to explain in detail steps illustrated in FIG. 4 and devices (apparatuses) used in predetermined ones of the steps illustrated in FIG. 4. The electronic component manufacturing method according to this embodiment will be described below with reference to FIGS. 4 to 16.

The electronic component manufacturing method according to this embodiment is suitably applied to the process of manufacturing the multilayer ceramic capacitor 1 having the above-described structure. First, as illustrated in FIG. 4, the electronic component base body 2 is prepared in a step (S1). The electronic component base body 2 is prepared as a plurality by forming the above-mentioned mother block, and by cutting the mother block into individual pieces.

Figure 5:
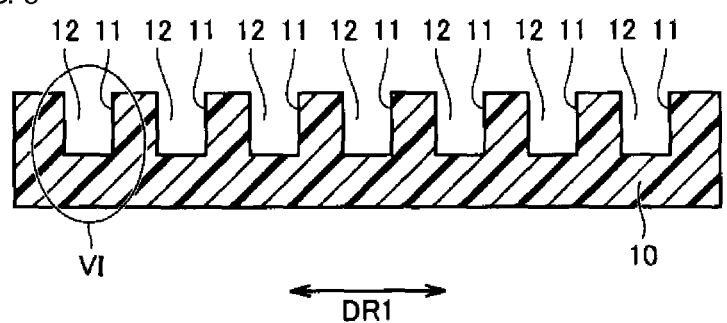
FIG. 5 is a sectional view of a component holder used in a step, illustrated in FIG. 4, of preparing the component holder.

Then, a component holder 10 is prepared in a step (S2). FIG. 5 is a sectional view of the component holder used in the step, illustrated in FIG. 4, of preparing the component holder. As illustrated in FIG. 5, the component holder 10 includes a plurality of receiving portions 11 defining accommodation spaces 12 each of which has a recessed shape and is able to accommodate the electronic component base body 2. The component holder 10 receives the electronic component base bodies 2 in the accommodation spaces 12 and holds the electronic component base bodies 2 therein. One electronic component base body 2 is inserted into one accommodation space 12. The component holder 10 is in the form of, e.g., a flat plate having a substantially rectangular shape when looked at in a plan view. The component holder 10 is vibrated in a direction denoted by DR1. The plural receiving portions 11 are formed in a matrix array at predetermined intervals.

Figure 6:
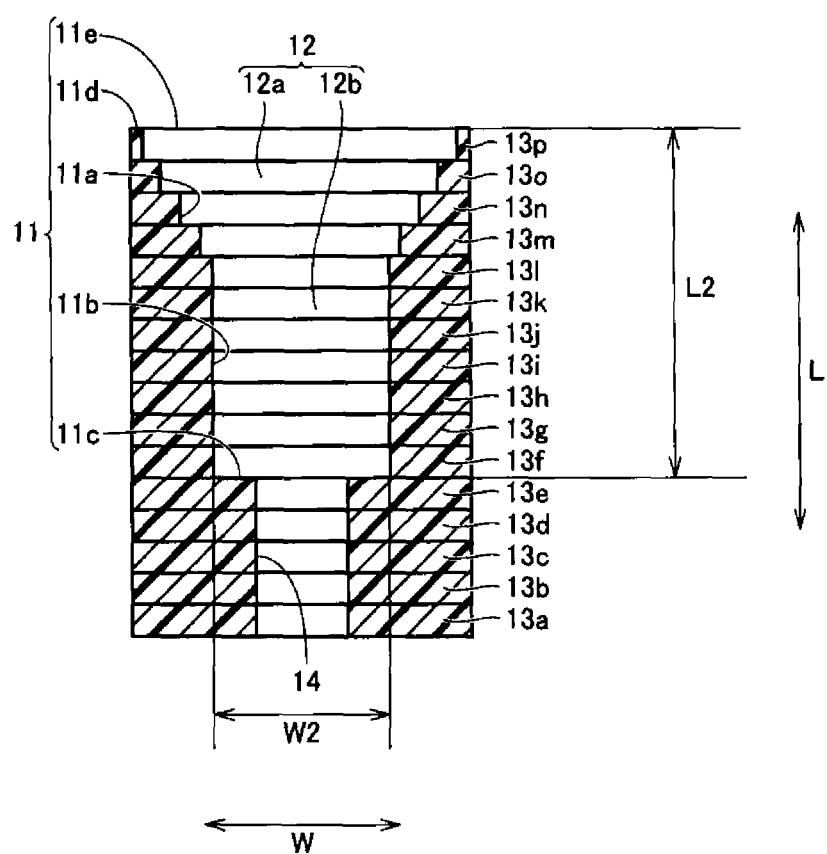
FIG. 6 is an enlarged sectional view of a receiving portion of the component holder, the view illustrating, in enlarged scale, a region surrounded by a line VI in FIG. 5.
Figure 7:
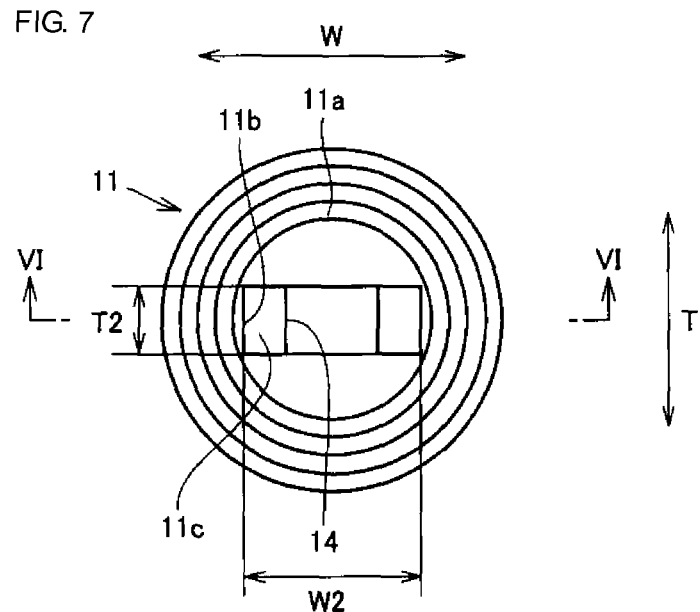
FIG. 7 is a plan view of the receiving portion of the component holder illustrated in FIG. 6.

FIG. 6 is an enlarged sectional view of the receiving portion of the component holder, the view illustrating, in enlarged scale, a region surrounded by a line VI in FIG. 5. FIG. 7 is a plan view of the receiving portion of the component holder illustrated in FIG. 6. A detailed shape of the receiving portion 11 will be described below with reference to FIGS. 6 and 7.

As illustrated in FIGS. 6 and 7, the receiving portion is formed by laminating sheet members 13a to 13p. The receiving portion 11 includes a guide portion 11a, an insertion portion 11b, a bottom 11c, a cavity end portion 11d, and an opening surface 11e.

The guide portion 11a guides the electronic component base body 2 toward the insertion portion 11b such that the electronic component base body 2 is inserted into the accommodation space 12. The guide portion 11a is formed in a stepped shape and has an inner diameter gradually reducing along a depth direction (i.e., toward a lower end from an upper end). The guide portion 11a is formed by laminating the plurality of sheet members 13m to 13p. The sheet members 13m to 13p have penetration holes in a substantially circular shape when looked at in a plan view, and inner diameters of the penetration holes are gradually reduced in order from the sheet member 13p to the sheet member 13m.

The insertion portion 11b has a substantially rectangular tubular shape being elongate in the depth direction, and it defines a later-described space 12b into which a most part of the electronic component base body 2 is inserted. The insertion portion 11b is formed by laminating the plurality of sheet members 13f to 13l. The sheet members 13f to 13l have penetration holes in a substantially rectangular shape when looked at in a plan view, and sizes of the penetration holes are almost the same.

The bottom 11c is formed in a shape projecting inwards from a lower end of the insertion portion 11b in the depth direction. A surface of the bottom 11c is defined by the sheet member 13e. The bottom 11c has a bore 14 in communication with the accommodation space 12. The bore 14 is formed substantially at the center of the bottom 11c. The bore 14 is defined by penetration holes that are formed in the sheet members 13a to 13e in continuous relation. The penetration holes formed in the sheet members 13a to 13e have a smaller size than those formed in the sheet members 13f to 13l.

The cavity end portion 11d is an upper end portion of a circumference surface defining the penetration hole in the sheet member 13p, and it defines the opening surface 11e. The opening surface 11e is a flat surface substantially parallel to the bottom 11c.

The accommodation space 12 includes a space 12a for leading the electronic component base body 2 into the accommodation space 12, and a space 12b for mainly accommodating the electronic component base body 2. The space 12a is defined by the guide portion 11a. The space 12a has a truncated conical shape with a lateral surface being in the form of steps.

The space 12b is defined by the insertion portion 11b, and it has a substantially rectangular parallelepiped shape corresponding to the shape of the electronic component base body 2. When looking at the space 12b in the substantially rectangular parallelepiped shape from a direction perpendicular to the opening surface 11e of the receiving portion 11, the space 12b has a width size W2 larger than the width size W1 of the electronic component base body 2, and a thickness size T2 larger than the thickness size T1 of the electronic component base body 2.

When the electronic component base body 2 has a flat and substantially rectangular parallelepiped shape, the width size W2 is preferably larger than the width size W1 of the electronic component base body 2 and not more than 1.2 times the width size W1. Furthermore, the thickness size T2 is preferably larger than the thickness size T1 of the electronic component base body 2 and is less than 2 times the thickness size T1. On the other hand, when the electronic component base body 2 has a substantially cubic shape, the width size W2 and the thickness size T2 are preferably not more than 1.2 times the width size W1 and the thickness size T1 of the electronic component base body 2. By setting the sizes of the accommodation space 12, it is possible to avoid two or more electronic component base bodies 2 from being inserted into one accommodation space 12.

A depth size of the receiving portion 11 defined by the distance between the bottom 11c of the receiving portion 11 and the opening surface 11e of the receiving portion 11, i.e., a depth size L2 that is a size of the accommodation space 12 in the depth direction, can be set to be slightly larger than the length size L1 of the electronic component base body 2. In that case, in a later-described step of inserting the electronic component base body 2, the electronic component base body 2 can be inserted into the accommodation space 12 in a state where the electronic component base body 2 does not protrude from the accommodation space 12. Thus, another electronic component base body 2 can be avoided from being caught with the electronic component base body 2 protruding from the receiving portion 11.

Moreover, when the depth size L2 is slightly larger than the length size L1 of the electronic component base body 2, a later-described plate member 31 can be, in a later-described step of taking out the electronic component base body 2, sufficiently contacted with the end surface of the electronic component base body 2 by pressing a later-described adhesive holding member 30 against the component holder 10 and causing the later-described plate member 31 to be flexed.

The depth size L2 is not limited to a value slightly larger than the length size L1 of the electronic component base body 2, and it may be smaller than the length size L1. In that case, the electronic component base body 2 is received in the receiving portion 11 such that the electronic component base body 2 partly protrudes from the receiving portion 11. Stated in another way, the electronic component base body 2 is received in the receiving portion 11 in a state where a part of the electronic component base body 2 is positioned outside the accommodation space 12. Therefore, in the later-described step of taking out the electronic component base body 2, the adhesive holding member 30 can be more easily contacted with the end surface of the electronic component base body 2.

The sheet members 13a to 13p are formed, for example, by bonding sheets each made of a proper synthetic material, e.g., a ceramic, or by laminating those sheets and firing them. Alternatively, the sheet members 13a to 13p may be formed by bonding synthetic resin sheets. When the component holder 10 is formed, the number of sheet members and the sizes of the penetration holes formed in the sheet members can be appropriately changed depending on the size of the electronic component base body 2.

Thereafter, as illustrated in FIG. 4, the electronic component base body 2 is inserted in a step (S3). In more detail, the individual electronic component base bodies 2 are first supplied onto a principal surface of the component holder having a plate-like shape at the side where the receiving portions 11 are formed. The component holder 10 is then vibrated to be reciprocally moved in the direction DR1. As a result, each of the individual electronic component base bodies changes its orientation while being guided by the guide portion 11a into a state where the lengthwise direction of the electronic component base body 2 comes closer to an up and down direction.

Figure 8:
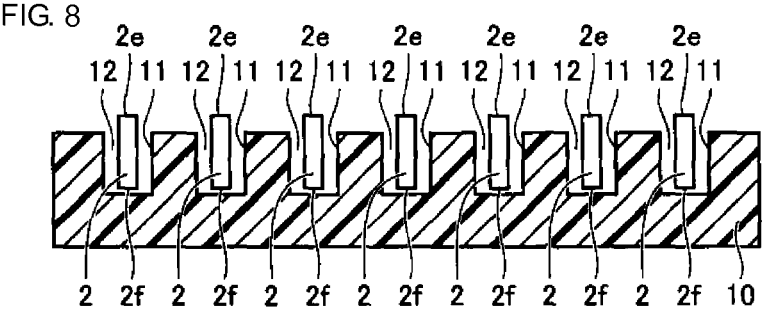
FIG. 8 illustrates a state after a step, illustrated in FIG. 4, of inserting each electronic component base body.

FIG. 8 illustrates a state after the step, illustrated in FIG. 4, of inserting the electronic component base body. As illustrated in FIG. 8, the electronic component base body 2 guided by the guide portion 11a is inserted into the insertion portion 11b and is received in the receiving portion 11 in such an upstanding or inclined posture that one end surface 2f of the pair of end surfaces 2e and 2f of the electronic component base body 2 faces the bottom 11c of the receiving portion 11.

When the component holder 10 used at that time is of the type that the depth size L2 of the accommodation space 12 in the depth direction is smaller than the length size L1 of the electronic component base body 2, the electronic component base body 2 is received in the receiving portion 11 in a state where at least a part of the electronic component base body 2 at the side including the other end surface 2e protrudes from the accommodation space 12.

On the other hand, when the component holder 10 used at that time is of the type that the depth size L2 of the accommodation space 12 in the depth direction is slightly larger than the length size L1 of the electronic component base body 2, the electronic component base body 2 is received in the receiving portion 11 in a state where the electronic component base body 2 is entirely received in the receiving portion 11 to such an extent that the other end surface 2e does not reach the opening surface 11e just a little.

Thereafter, as illustrated in FIG. 4, an oleophobic film is formed on surfaces of the electronic component base body 2 in a step (S4). A later-described film forming apparatus 20 is used to form the oleophobic film.

Figure 9:
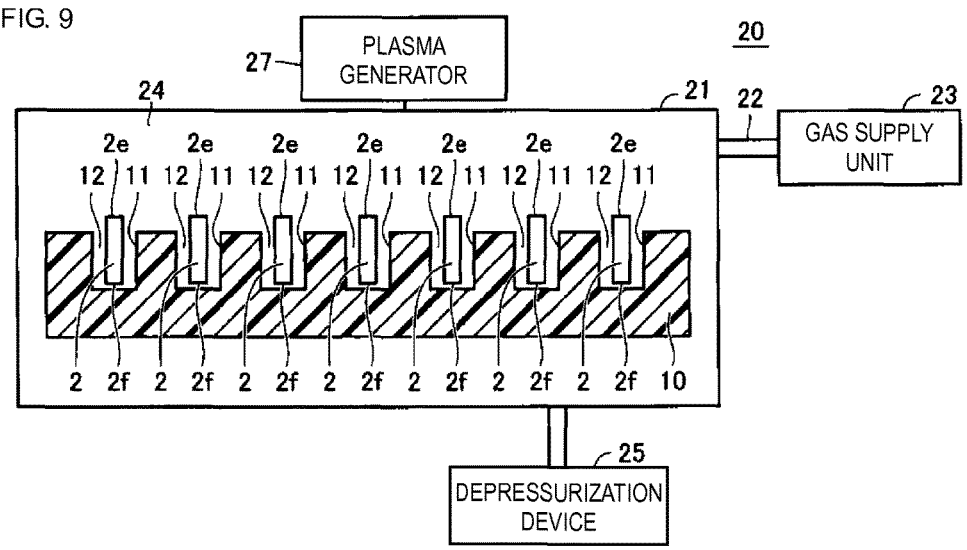
FIG. 9 is a schematic view illustrating a film forming apparatus that is used in a step, illustrated in FIG. 4, of forming an oleophobic film on surfaces of the electronic component base body.

FIG. 9 is a schematic view illustrating the film forming apparatus that is used in the step, illustrated in FIG. 4, of forming the oleophobic film on the surfaces of the electronic component base body. As illustrated in FIG. 9, the film forming apparatus 20 according to this embodiment includes a chamber 21, a gas introducing pipe 22, a gas supply unit 23, a depressurization device 26, and a plasma generator 27. For example, a microwave supply device may be employed as the plasma generator 27.

The chamber 21 has an entrance (not illustrated) that can be opened and closed. The chamber 21 further has an inner space 24 capable of receiving the component holder 10. After opening the entrance and setting the component holder 10 in the chamber 21, the entrance is closed. In such a way, the component holder 10 is placed in the chamber 21.

The depressurization device 26 depressurizes the interior of the chamber 21 that is enclosed with the component holder 10 placed in the chamber 21. When the interior of the chamber 21 is depressurized to a predetermined pressure, gas and so on are supplied to the interior of the chamber 21 from the gas supply unit 23 through the gas introducing pipe 22.

After Ar gas has been supplied from the gas supply unit 23, a microwave is introduced from the plasma generator 27, and particles of the Ar gas are discharged (ionized) by the power of the microwave. Thus, the Ar gas is brought into a plasma state. The Ar gas in the plasma state enters the receiving portion 11 and is supplied to the surroundings of the electronic component base body 2. As a result, the Ar gas functions to weaken the chemical coupling force that acts on foreign matters adhering to the surfaces of the electronic component base body 2, and to separate the foreign matters from the relevant surfaces, or functions to chemically decompose the foreign matters themselves and to remove them from the relevant surfaces. In such a way, the surfaces of the electronic component base body 2 are first cleaned in the step of forming the oleophobic film on the surfaces of the electronic component base body 2.

Next, gas containing an oleophobic material is supplied to the chamber 21 from the gas supply unit 23. Carbon fluoride gas is used as the gas. For example, carbon fluoride (CxFy) is advantageously used. In particular, CxFy gas satisfying y/x≤2.5 is preferable. When carbon fluoride is used as mentioned above, a monomer containing CF and $CF_2$ as main components is generated. Furthermore, in plasma treatment, a plasma voltage power is set to 100 V to 200 V, a gas flow rate is set to 100 cc/min to 250 cc/min, and a treatment time is set to 1 to 3 min, for example. Upon the particles of the gas being discharged (ionized) by the operation of the plasma generator 27, a coating agent in the monomer form of CF and $CF_2$ (i.e., the gas in the plasma state) is generated. The coating agent in the monomer form of CF and $CF_2$ is deposited on the surfaces of the electronic component base body 2, whereby the oleophobic film is formed on the surfaces of the electronic component base body 2. The oleophobic film suppresses a later-described conductive paste from spreading out on the surfaces of the electronic component base body 2.

As described above, each electronic component base body is inserted into the receiving portion 11 in such an upstanding or inclined state where one end surface 2f of the electronic component base body 2 faces the bottom 11c of the receiving portion 11. Therefore, a contact area between the receiving portion 11 and the electronic component base body 2 can be reduced. More specifically, when the electronic component base body 2 is in the upstanding state, a part of the one end surface 2f contacts the bottom 11c including the bore 14. On the other hand, when the electronic component base body 2 is in the inclined state, a part of the one end surface 2f and just a very limited part of the pair of principal surfaces 2a and 2b and the pair of lateral surfaces 2c and 2d contact the receiving portion 11. Accordingly, the gas in the plasma state can be brought into contact with a most part of the surfaces of the electronic component base body 2, and the oleophobic film can be substantially uniformly formed over a wide region. The oleophobic film is just needed to be formed on a necessary region, and is not always required to be uniformly formed all over the surfaces of the electronic component base body. The formed oleophobic film may be partly lacked. The oleophobic film may be formed in multiple layers by carrying out the treatment plural times.

Thus, the film forming apparatus 20 according to this embodiment includes the chamber 21 having the inner space 24 in which the gas to form the oleophobic film is filled, and it can form the oleophobic film on the surfaces of each electronic component base body 2 in the state where the component holder 10 holding the electronic component base body 2 inserted in the receiving portion 11, which defines the accommodation space 12 capable of receiving the electronic component base body 2, is placed in the inner space 24. After the oleophobic film has been formed on the surfaces of the electronic component base body 2, the interior of the chamber 21 is released to the atmosphere, the entrance is opened, and the component holder 10 is taken out from the chamber 21.

Figure 10:
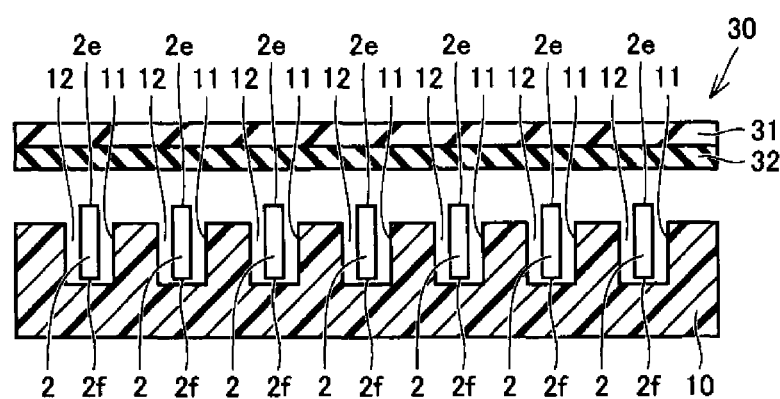
FIG. 10 illustrates a first sub-step of a step, illustrated in FIG. 4, of taking out the electronic component base body from the receiving portion.

Thereafter, as illustrated in FIG. 4, the electronic component base body is taken out from the receiving portion in a step (S5). In the step (S5), the other end surface 2e of the pair of end surfaces 2e and 2f is stuck to and held by the adhesive holding member 30, and the electronic component base body 2 is taken out from the receiving portion 11. FIG. 10 to illustrate, respectively, first to third sub-steps of the step, illustrated in FIG. 4, of taking out the electronic component base body from the receiving portion.

As illustrated in FIG. 10, the adhesive holding member 30 is first prepared in the first sub-step of the step of taking out the electronic component base body 2 from the receiving portion 11.

The adhesive holding member 30 includes a plate member in the form of a plate, and an adhesive layer 32. The adhesive layer 32 is disposed on a principal surface of the plate member 31, which is positioned to face the component holder 10. The adhesive layer 32 sticks to the electronic component base body 2, thus holding it by the adhesive action. The adhesive holding member 30 is arranged above the component holder 10 such that the adhesive layer 32 comes into a state facing the component holder 10.

Figure 11:
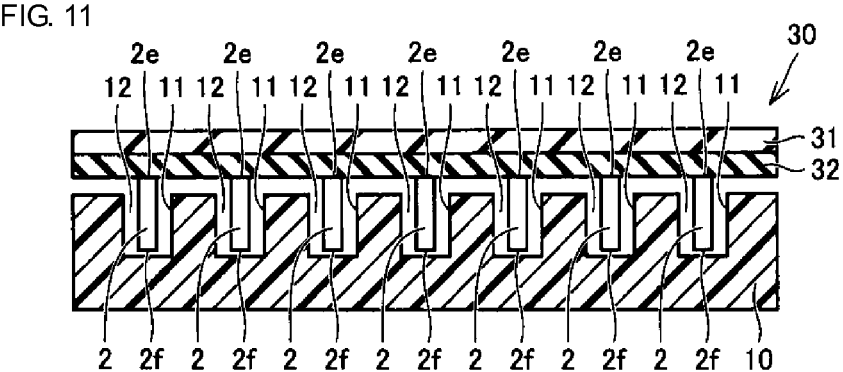
FIG. 11 illustrates a second sub-step of the step, illustrated in FIG. 4, of taking out the electronic component base body from the receiving portion.

In the second sub-step of the step of taking out the electronic component base body 2 from the receiving portion 11, as illustrated in FIG. 11, the adhesive holding member 30 is descended to press the adhesive layer 32 against the other end surfaces 2e of the individual electronic component base bodies 2. As a result, the individual electronic component base bodies 2 are stuck to and held by the adhesive holding member 30.

Figure 12:
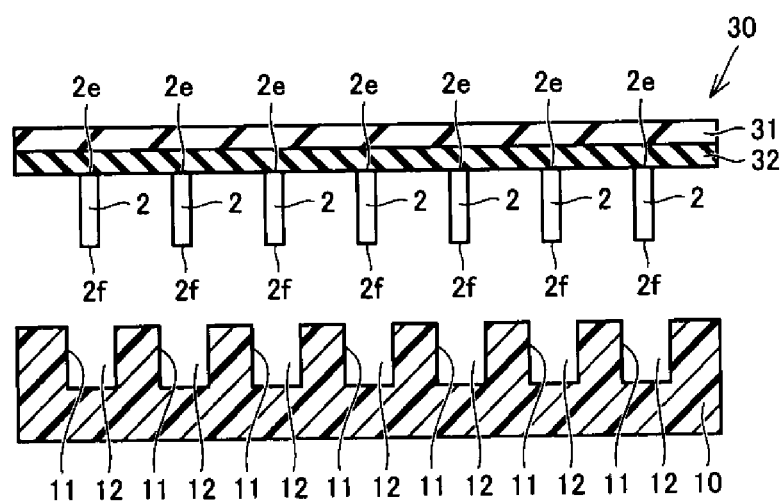
FIG. 12 illustrates a third sub-step of the step, illustrated in FIG. 4, of taking out the electronic component base body from the receiving portion.

In the third sub-step of the step of taking out the electronic component base body 2 from the receiving portion 11, as illustrated in FIG. 12, the adhesive holding member 30 is ascended to move the component holder 10 away from the component holder 10. The individual electronic component base bodies 2 are also ascended together with the adhesive holding member 30, whereby the individual electronic component base bodies 2 are taken out from the component holder 10. The individual electronic component base bodies 2 are maintained in the state arrayed in a matrix pattern.

Figure 13:
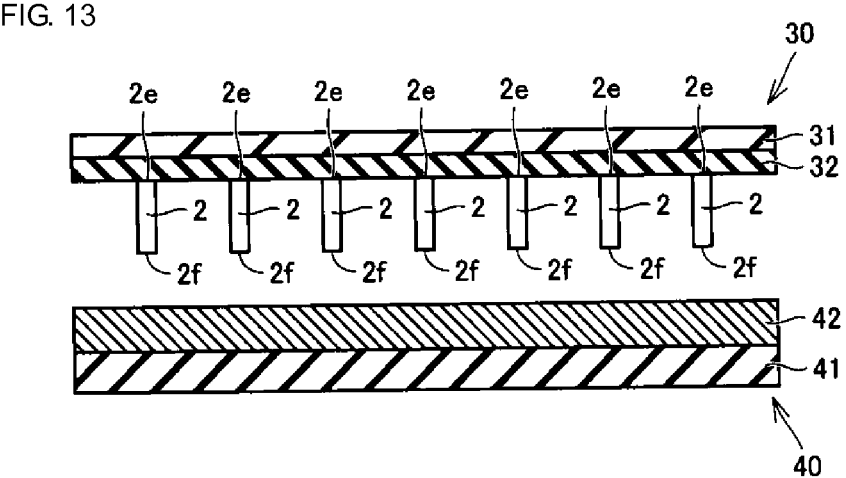
FIG. 13 illustrates a first sub-step of a step, illustrated in FIG. 4, of forming outer electrodes.
Figure 14:
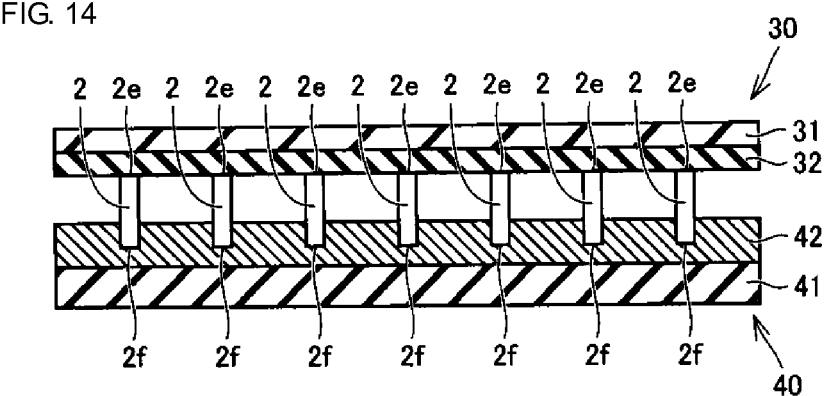
FIG. 14 illustrates a second sub-step of the step, illustrated in FIG. 4, of forming the outer electrodes.
Figure 15:
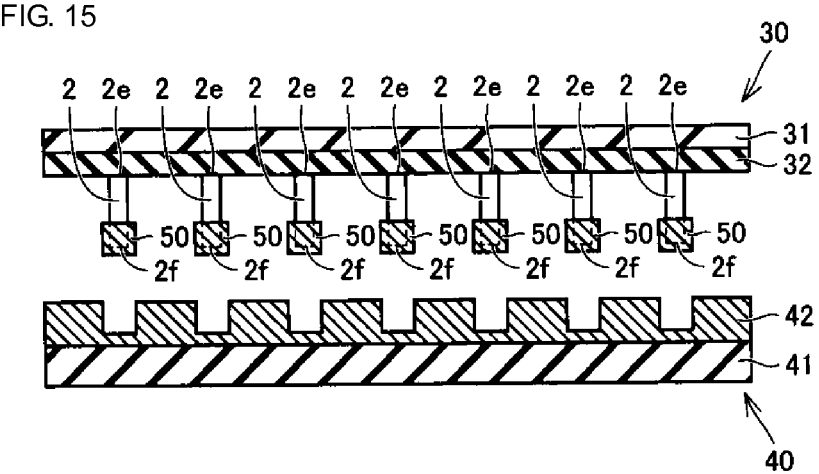
FIG. 15 illustrates a third sub-step of the step, illustrated in FIG. 4, of forming the outer electrodes.

Thereafter, as illustrated in FIG. 4, the outer electrodes are formed in a step (S6). The step of forming the outer electrodes includes a step (S7) of applying a conductive paste, which is to be the outer electrodes, over an end portion of each electronic component base body 2 at the side including the one end surface 2$f$ in the state where the other end surface 2$e$ is stuck to and held by the adhesive holding member 30. FIGS. 13 to 15 illustrate respectively first to third sub-steps of the step, illustrated in FIG. 4, of forming the outer electrodes.

In the first sub-step of the step of forming the outer electrodes, as illustrated in FIG. 13, the adhesive holding member 30 including the individual electronic component base bodies 2 stuck to and held by the same is arranged to face an application apparatus 40. At that time, the one end surface 2$f$ of each electronic component base body 2 is in a state facing a later-described conductive paste 42. The application apparatus 40 includes an application stage 41, and the conductive paste 42 that is the raw material of the outer electrodes. The application stage 41 serves to hold the conductive paste 42.

In the second sub-step of the step of forming the outer electrodes, as illustrated in FIG. 14, the adhesive holding member 30 holding the individual electronic component base bodies 2 is descended to make the one end surface 2$f$ of each of the individual electronic component base bodies 2 be immersed in the conductive paste 42. As a result, the conductive paste 42 is applied over an end portion of the electronic component base body 2 at the side including the one end surface 2$f$. In the third sub-step of the step of forming the outer electrodes, as illustrated in FIG. 15, the adhesive holding member 30 is ascended, and an applied conductive paste 50 is dried.

Figure 16:
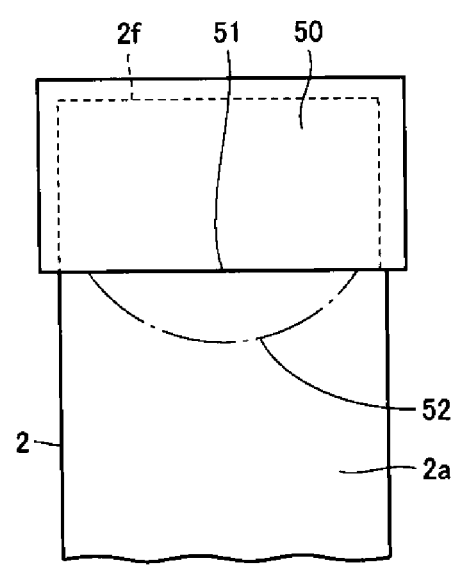
FIG. 16 illustrates a conductive paste that is formed on the surfaces of the electronic component base body in the step, illustrated in FIG. 4, of forming the outer electrodes.

FIG. 16 illustrates the conductive paste that is formed on the surfaces of the electronic component base body in the step, illustrated in FIG. 4, of forming the outer electrodes. In this embodiment, as described above, the oleophobic film is uniformly formed over a most part of the surfaces of the electronic component base body 2, including the principal surfaces 2$a$ and 2$b$ and the lateral surfaces 2$c$ and 2$d$. Therefore, as illustrated in FIG. 16, the conductive paste 42 can be prevented from spreading out over the principal surfaces 2$a$ and 2$b$ and the lateral surfaces 2$c$ and 2$d$. As a result, an end portion 51 of the applied conductive paste 50 at the side positioned away from the one end surface 2$f$ is formed linearly.

If the oleophobic film is not formed, the conductive paste would be caused to spread out over the principal surfaces 2$a$ and 2$b$ and the lateral surfaces 2$c$ and 2$d$ by the action of surface tension. Therefore, if the oleophobic film is not present, an end portion 52 of the applied conductive paste 50 would be formed, as denoted by a one-dot-chain line in FIG. 16, in a shape curving to gradually expand as a distance from the one end surface 2$f$ increases.

Then, another adhesive holding member is pressed against the one end surface 2$f$ to which the conductive paste has been applied, and the other adhesive holding member is moved away from the above-mentioned adhesive holding member 30. As a result, the individual electronic component base bodies 2 are stuck to and held by the other adhesive holding member. After changing the orientation of the other adhesive holding member, the other end surface 2$e$ of each electronic component base body 2 at the side not including the applied conductive paste 50 is immersed in the conductive paste 42, whereby the conductive paste is applied over an end portion of the electronic component base body 2 at the side including the other end surface 2$e$.

Then, the electronic component base body 2 including the conductive pastes 50 applied over the end portions at both the sides including the pair of end surfaces 2$e$ and 2$f$ is heated to bake the conductive paste 50. As a result, the sintered metal layers 5$a$ are formed in a state covering the pair of end surfaces 2$e$ and 2$f$ of the electronic component base body 2.

Then, the outer electrodes 5 are each formed by forming several types of plated layers 5$b$ and 5$c$, e.g., a Ni plated layer and a Sn plated layer, over each of the sintered metal layers 5$a$. As a result, the multilayer ceramic capacitor 1 is manufactured.

As described above, by employing the film forming apparatus and the electronic component manufacturing method according to this embodiment, the gas containing the oleophobic material can be supplied in a way of flowing around the surfaces of the electronic component base body 2 and can be brought into contact with those surfaces. Therefore, the oleophobic film can be uniformly formed over the surfaces of the electronic component base body 2. In particular, since the gas containing the oleophobic material is brought into contact with the surfaces of the electronic component base body 2 in the state where the electronic component base body 2 is held by the component holder 10 with the electronic component base body 2 being in the upstanding or inclined posture, the oleophobic film can be uniformly formed on the surfaces of the electronic component base body 2 over a wide region.

As a result, the conductive paste can avoid spreading out over the surfaces of the electronic component base body 2, and short-circuiting can be prevented from occurring between the outer electrode formed at the side including the one end surface 2$f$ and the outer electrode formed at the side including the other end surface 2$e$.

Moreover, since the end portion of the outer electrode is formed linearly, the distance between the outer electrode formed at the side including the one end surface 2$f$ and the outer electrode formed at the side including the other end surface 2$e$ can be ensured at a certain length. Thus, when the electronic component base body 2 is manufactured in a smaller size, short-circuiting between the outer electrodes can be prevented with even higher reliability than in the related art.

Second Embodiment

Figure 17:
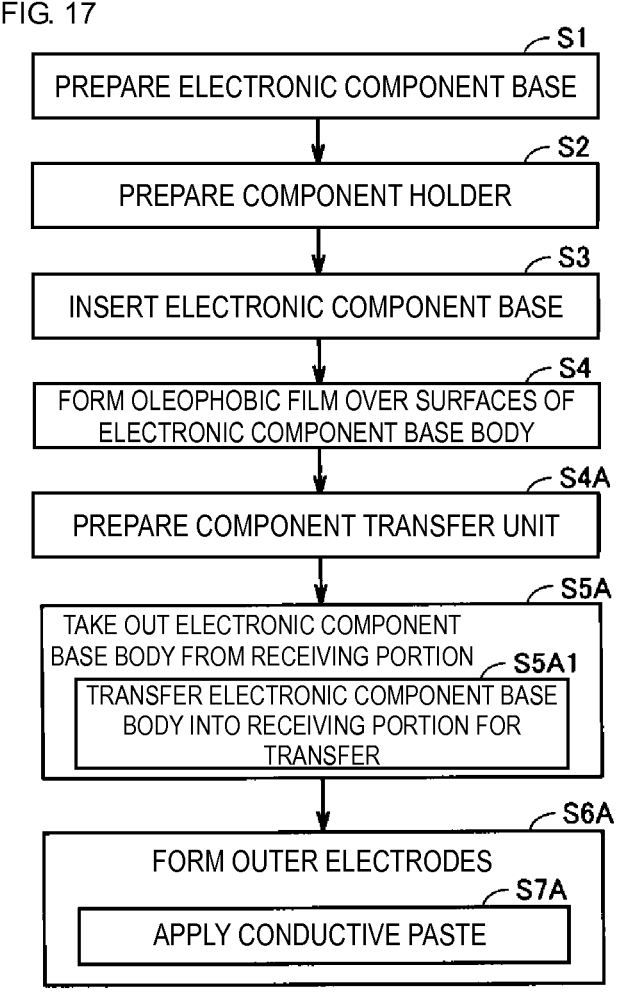
FIG. 17 is a flowchart illustrating an outline of a process of manufacturing a multilayer ceramic capacitor in accordance with an electronic component manufacturing method according to a second embodiment of the present disclosure.

FIG. 17 is a flowchart illustrating an outline of a process of manufacturing a multilayer ceramic capacitor in accordance with an electronic component manufacturing method according to a second embodiment of the present disclosure. The electronic component manufacturing method according to this embodiment will be described below with reference to FIG. 17.

In comparison with the electronic component manufacturing method according to the first embodiment, as illustrated in FIG. 17, the electronic component manufacturing method according to the second embodiment is different in a step (S5A) of taking out the electronic component base body from the receiving portion and a step (S6A) of forming the outer electrodes.

In the electronic component manufacturing method according to the second embodiment, processing in steps (S1) to (S4) is performed in a similar manner to that in the electronic component manufacturing method according to the first embodiment.

Figure 18:
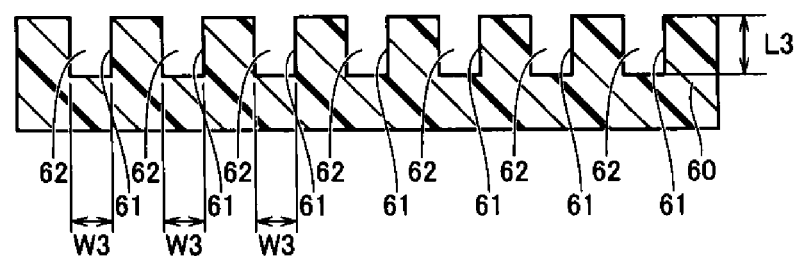
FIG. 18 is a sectional view of a component transfer unit used in a step, illustrated in FIG. 17, of preparing the component transfer unit.

In a next step (S4A), a component transfer unit 60 (see FIG. 18) is prepared. The component transfer unit 60 is used to transfer the individual electronic component base bodies 2 held by the component holder 10. FIG. 18 is a sectional view of the component transfer unit used in the step, illustrated in FIG. 17, of preparing the component transfer unit. A detailed structure of the component transfer unit 60 will be described below with reference to FIG. 18.

As illustrated in FIG. 18, the component transfer unit includes receiving portion for transfers 61 defining accommodation spaces for transfer 62 each of which has a recessed shape and is capable of receiving the electronic component base body 2. The component transfer unit 60 receives the electronic component base bodies 2 in the accommodation spaces for transfer 62 and holds the electronic component base bodies 2 therein. One electronic component base body 2 is inserted into one accommodation space for transfer 62. The receiving portion for transfer 61 has an opening surface.

Each of the accommodation spaces for transfer 62 defined by the receiving portion for transfers 61 of the component transfer unit 60 includes a space that has a substantially rectangular parallelepiped shape corresponding to the shape of the electronic component base body 2. When looking at the space, which is included in the accommodation space for transfer 62 and which has the substantially rectangular parallelepiped shape, from a direction perpendicular to the opening surface of the receiving portion for transfer 61, the relevant space, i.e., the substantially rectangular parallelepiped space, has a width size W3 larger than the width size W1 of the electronic component base body 2, and a thickness size T3 larger than the thickness size T1 thereof (see FIG. 19). Though not illustrated, the thickness size T3 represents a size of the above substantially rectangular parallelepiped space in a direction perpendicular to the drawing sheet of FIG. 18.

The component transfer unit 60 is preferably prepared as a unit satisfying at least a condition that the width size W3 is smaller than the above-mentioned width size W2 of the accommodation space, or a condition that the thickness size T3 is smaller than the above-mentioned thickness size T2 of the accommodation space, and further satisfying a condition that a depth size L3, which represents a size of the accommodation space for transfer 62 in the depth direction, and which is defined as the distance between a bottom of the receiving portion for transfer 61 and the opening surface of the receiving portion for transfer 61, is smaller than the length size L1 of the electronic component base body.

Here, satisfying at least the condition that the width size W3 is smaller than the width size W2 or that the thickness size T3 is smaller than the thickness size T2 implies any one of the case satisfying the condition that the width size W3 is smaller than the width size W2 and the thickness size T3 is smaller than the thickness size T2, the case satisfying the condition that the width size W3 is smaller than the width size W2 and the thickness size T3 is equal to the thickness size T2, and the case satisfying the condition that the width size W3 is equal to the width size W2 and the thickness size T3 is smaller than the thickness size T2.

With that size setting, a sectional area of the above substantially rectangular parallelepiped space when viewed in a direction parallel to the opening surface is reduced from that of the substantially rectangular parallelepiped space included in the accommodation space 12 of the component holder 10. Accordingly, in a later-described step of transferring the electronic component base body 2 into the receiving portion for transfer 61, the electronic component base body 2 can be held in a state closer to the upstanding state.

Thereafter, the electronic component base body 2 is taken out from the receiving portion 11 in a step (S5A). The step (S5A) includes a step (S5A1) of transferring the electronic component base body 2 into the receiving portion for transfer 61. The step of transferring the electronic component base body into the receiving portion for transfer includes a first sub-step and a second sub-step as follows.

Figure 19:
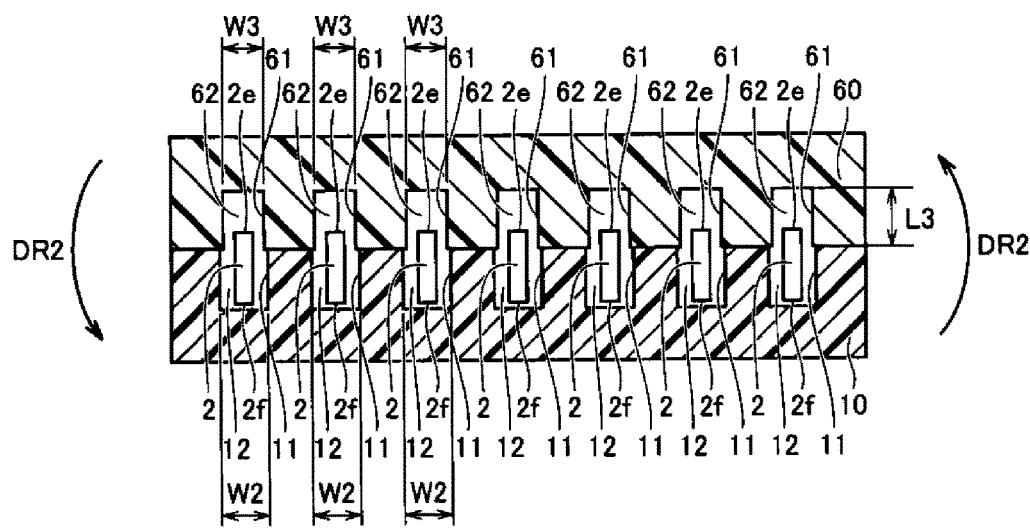
FIG. 19 illustrates a first sub-step of a step, illustrated in FIG. 17, of transferring the electronic component base body into a receiving portion for transfer.
Figure 20:
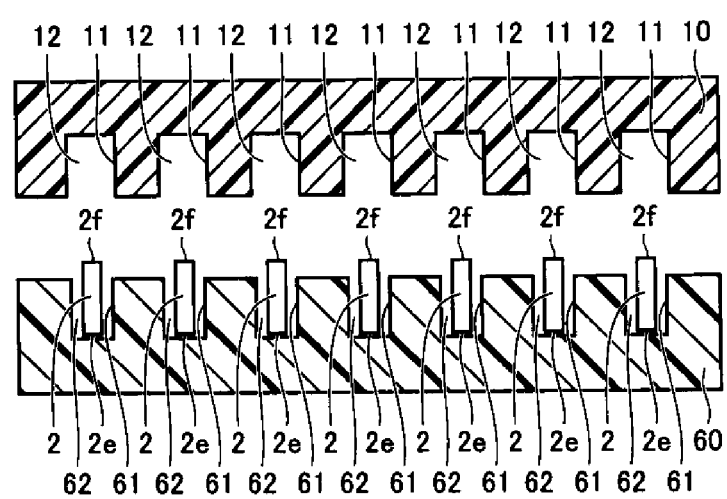
FIG. 20 illustrates a second sub-step of the step, illustrated in FIG. 17, of transferring the electronic component base body into the receiving portion for transfer.

FIGS. 19 and 20 illustrate respectively the first sub-step and the second sub-step of the step, illustrated in FIG. 17, of transferring the electronic component base body into the receiving portion for transfer.

In the first sub-step of the step of transferring the electronic component base body into the receiving portion for transfer, as illustrated in FIG. 19, the prepared component transfer unit 60 is arranged to face the component holder 10 such that the receiving portions 11 of the component holder 10 and the receiving portions for transfer 61 of the component transfer unit 60 are positioned to face each other. At that time, the component transfer unit 60 may be placed on the component holder 10, or located apart from the component holder 10.

Then, the component holder 10 and the component transfer unit 60 facing each other are turned around, for example, in a direction denoted by DR2 in FIG. 19. The component transfer unit 60 having been positioned above the component holder 10 is now positioned below the component holder 10. As a result, the individual electronic component base bodies 2 are transferred from the receiving portions 11 of the component holder 10 to the receiving portions for transfer 61 of the component transfer unit 60.

In the second sub-step of the step of transferring the electronic component base body into the receiving portion for transfer, as illustrated in FIG. 20, the component holder 10 is ascended to be moved away from the component transfer unit 60. With the ascent of the component holder 10, the individual electronic component base bodies 2 are taken out from the receiving portions 11 of the component holder 10. When the component transfer unit 60 with the depth size L3 of the accommodation space for transfer 62 being smaller than the length size L1 of the electronic component base body 2 is used as described above, the individual electronic component base bodies 2 are each inserted in the receiving portion for transfer 61 in a state where at least a part of the electronic component base body 2 at the side including the one end surface 2f protrudes from the accommodation space for transfer 62.

Moreover, the width size W3 in a part of the space defined by the receiving portion for transfer 61 of the component transfer unit 60 is smaller than the width size W2 of the space 12b defined by the receiving portion 11 of the component holder 10. In the second embodiment, therefore, the electronic component base bodies 2 are accommodated in the component transfer unit 60 in the upstanding state at a larger rate in number than in the first embodiment. In addition, the other electronic component base bodies 2 than those accommodated in the upstanding state are held in the component transfer unit 60 in inclined states closer to the upstanding state.

Figure 21:
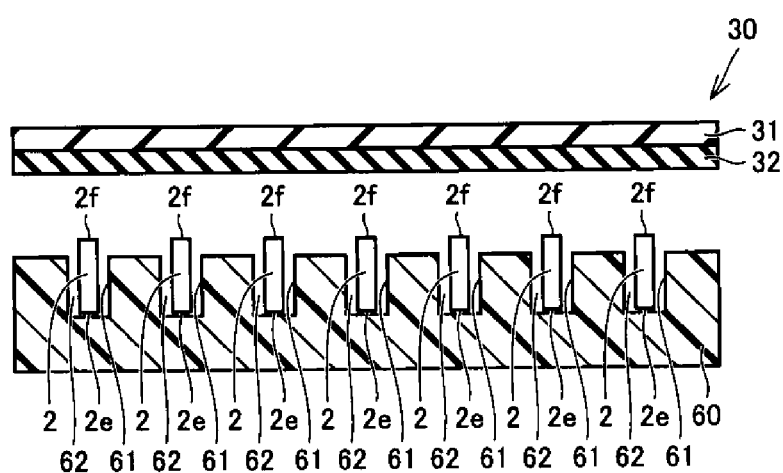
FIG. 21 illustrates a step of taking out the electronic component base body from the receiving portion for transfer, the step being included in a step, illustrated in FIG. 17, of forming outer electrodes.

Thereafter, as illustrated in FIG. 17, the outer electrodes are formed in a step (S6A). FIG. 21 illustrates a step of taking out the electronic component base body from the receiving portion for transfer, the step being included in the step, illustrated in FIG. 17, of forming the outer electrodes.

In the step of forming the outer electrodes, the individual electronic component base bodies 2 are first taken out from the component transfer unit 60. At that time, the adhesive holding member 30 is arranged to face the component transfer unit 60. The adhesive holding member 30 is then descended such that the adhesive layer 32 is pressed against the one end surface 2$f$ of each of the individual electronic component base bodies 2. As a result, the individual electronic component base bodies 2 are stuck to and held by the adhesive holding member 30.

Then, the adhesive holding member 30 is ascended to be moved away from the component transfer unit 60. The individual electronic component base bodies 2 are also ascended together with the adhesive holding member 30, whereby the individual electronic component base bodies 2 are taken out from the receiving portion for transfer 61.

Thereafter, a conductive paste is applied to each electronic component base body 2 in a similar manner to that in the manufacturing process subsequent to the step (S7) in the first embodiment. In the second embodiment, the conductive paste used as a raw material of the outer electrodes is applied over an end portion of the electronic component base body 2 at the side including the other end surface 2$e$ in the state where the one end surface 2$f$ is stuck to and held by the adhesive holding member 30. Since the individual electronic component base bodies 2 are each stuck to and held by the adhesive holding member 30 in a state closer to the upstanding state, the conductive paste can be applied to the individual electronic component base bodies 2 at higher accuracy than in the first embodiment. Then, the conductive paste is applied over an end portion of the electronic component base body 2 at the side including the one end surface 2$f$.

Thereafter, the applied conductive paste is baked to form the sintered metal layer 5$a$, and plated layers are formed on the sintered metal layer 5$a$, whereby the outer electrodes 5 are formed on the electronic component base body 2. Thus, the multilayer ceramic capacitor 1 can be manufactured.

By employing the electronic component manufacturing method and the film forming apparatus described above, the second embodiment can provide advantageous effects equivalent to or more than those obtained with the first embodiment. In particular, since accuracy in applying the conductive paste is increased, short-circuiting between the outer electrodes positioned at one side and the other end can be prevented with higher reliability.

While the first and second embodiments have been described, by way of example, in connection with the case where the gas used to form the oleophobic film is carbon fluoride gas, the gas is not limited to such an example, and gases containing other components can also be optionally used insofar as the gases are able to form films having oleophobic properties.

While the first and second embodiments have been described, by way of example, in connection with the case where the electronic component base body 2 has the substantially rectangular parallelepiped shape, the shape of the electronic component base body 2 is not limited to such an example, and it may be cubic. The inner structure of the multilayer ceramic capacitor is also not limited to the structure disclosed in the first and second embodiments, and it may be modified as required.

While the first and second embodiments have been described, by way of example, in connection with the case where the electronic component is the multilayer ceramic capacitor, the electronic component is not limited to such an example, and various types of electronic components each having outer electrodes, e.g., a piezoelectric component, a thermistor, and an inductor, can be optionally employed as the electronic component in the present disclosure.

While preferred embodiments of the disclosure have been described above, the disclosed embodiments are to be considered in all respects as illustrative and not restrictive. The scope of the disclosure is to be determined solely by the following claims, and involves all variations and modifications, which will be apparent to those skilled in the art, and which are equivalent in meaning to the claims without departing from the spirit of the disclosure.

The invention claimed is:

1. An electronic component manufacturing method comprising the steps of:
   inserting an electronic component base body in a receiving portion of a component holder, the electronic component base body having a substantially rectangular parallelepiped shape and which has a pair of end surfaces positioned in opposing relation, a pair of lateral surfaces positioned in opposing relation, and a pair of principal surfaces positioned in opposing relation, the receiving portion defining an accommodation space that has a recessed shape and is capable of receiving the electronic component base body;
   forming an oleophobic film over the exposed surfaces of the electronic component base body by exposing the surfaces of the electronic component base body inserted in the receiving portion to gas containing an oleophobic material;
   taking out the electronic component base body, which includes the oleophobic film formed thereon, from the receiving portion; and
   forming outer electrodes on the electronic component base body taken out from the receiving portion.

2. The electronic component manufacturing method according to claim 1, wherein the rectangular parallelepiped shape of the electronic component base body has a length size L1 being larger than each of a width size W1 and a thickness size T1, given that a size of the electronic component base body in a lengthwise direction in which the pair of end surfaces are arranged in opposing relation is the length size L1, a size of the electronic component base body in a widthwise direction in which the pair of lateral surfaces are arranged in opposing relation is the width size W1, and a size of the electronic component base body in a thickness direction in which the pair of principal surfaces are arranged in opposing relation is the thickness size T1, and
   in the step of inserting the electronic component base body, the electronic component base body is inserted in the receiving portion in a state where the electronic component base body is in an upstanding or inclined posture such that a first one of the pair of end surfaces is directed to a bottom of the receiving portion.

3. The electronic component manufacturing method according to claim 2, wherein the accommodation space includes a substantially rectangular parallelepiped space that has a width size W2 larger than the width size W1 of the electronic component base body and a thickness size T2 larger than the thickness size T1 of the electronic component base body when viewed from a direction perpendicular to an opening surface of the receiving portion, and the component holder satisfies a condition that the width size W2 and the thickness size T2 are each smaller than the length size L1 of the electronic component base body.

4. The electronic component manufacturing method according to claim 2, wherein the step of taking out the electronic component base body includes a step of causing a second one of the pair of end surfaces to be stuck to and held by an adhesive holding member, and taking out the electronic component base body from the receiving portion.

5. The electronic component manufacturing method according to claim 4, wherein, in the step of inserting the electronic component base body, the electronic component base body is inserted in the receiving portion in a state where at least a part of the electronic component base body at a side including the second one of the pair of end surfaces protrudes from the accommodation space, by employing the component holder in which a depth size L2 representing a size of the accommodation space in a depth direction is smaller than the length size L1 of the electronic component base body, and the depth size L2 is defined by a distance between a bottom of the receiving portion and an opening surface of the receiving portion, and the step of forming the outer electrodes includes a step of applying a conductive paste, which is to be the outer electrodes, over an end portion of the electronic component base body at a side including the first one of the pair of end surfaces in the state where the second one of the pair of end surfaces is stuck to and held by the adhesive holding member.

6. The electronic component manufacturing method according to claim 3, wherein the method further comprises a step of preparing a component transfer unit including a receiving portion for transfer defining an accommodation space for transfer that has a recessed shape and is capable of receiving the electronic component base body, the step of taking out the electronic component base body includes a step of transferring the electronic component base body, which includes the oleophobic film formed thereon, into the receiving portion for transfer from the receiving portion, the accommodation space for transfer includes a substantially rectangular parallelepiped space that has a width size W3 larger than the width size W1 of the electronic component base body and a thickness size T3 larger than the thickness size T1 of the electronic component base body when viewed from a direction perpendicular to the opening surface of the receiving portion for transfer, the component transfer unit used in the transferring step satisfies at least a condition that the width size W3 is smaller than the width size W2 of the accommodation space, or a condition that the thickness size T3 is smaller than the thickness size T2 of the accommodation space, and satisfies a condition that a depth size L3 is smaller than the length size L1 of the electronic component base body, which represents a size of the accommodation space for transfer in the depth direction, and which is defined as a distance between a bottom of the receiving portion for transfer and the opening surface of the receiving portion for transfer, the step of transferring the electronic component base body into the receiving portion for transfer includes a step of arranging the component transfer unit to face the component holder in a state where the receiving portion and the receiving portion for transfer are positioned to face each other, and a step of turning around the component holder and the component transfer unit facing each other such that the electronic component base body is inserted into the receiving portion for transfer in a state where at least a part of the electronic component base body at a side including the first one of the pair of end surfaces protrudes from the accommodation space for transfer, and the step of forming the outer electrodes includes a step of taking out the electronic component base body from the receiving portion for transfer by causing the first one of the pair of end surfaces of the electronic component base body to be stuck to and held by the adhesive holding member, and applying a conductive paste, which is to be the outer electrodes, over an end portion of the electronic component base body at a side including a second one of the pair of end surfaces in the state where the first one of the pair of end surfaces is stuck to and held by the adhesive holding member.

7. The electronic component manufacturing method according to claim 1, the recessed shape of the component holder including a circular opening positioned adjacent to a rectangular insertion opening, the rectangular insertion opening sized and dimensioned to receive the electronic component base body.

* * * * *